Patented Feb. 9, 1954

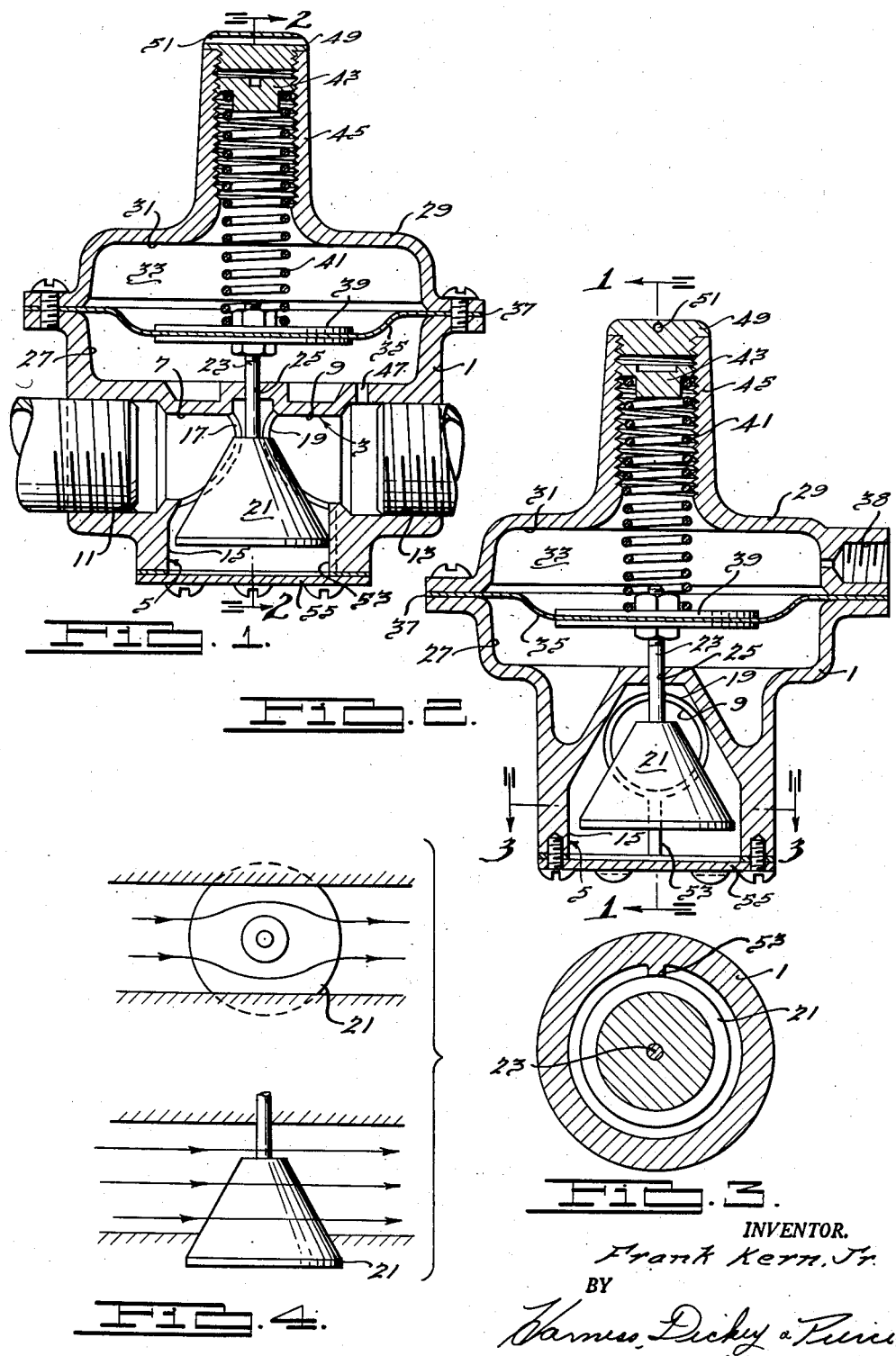

2,668,396

UNITED STATES PATENT OFFICE 2,668,396

GAS REGULATOR

Frank Kern, Jr., Detroit, Mich., assignor to Maxitrol Company, Detroit, Mich., a corporation of Michigan Application September 21, 1948, Serial No. 50,414

9 Claims. (Cl. 50—23)

This invention relates to fluid flow control apparatus and in particular to gas regulators.

Gas regulators are employed in the supply lines to many domestic and industrial devices, such as furnaces, stoves, refrigerators, etc., for the purpose of automatically maintaining constant inlet pressures to the devices despite rather wide variations in pressure in the supply lines. The regulation provided by gas regulators is essential to the safe and satisfactory operation of these devices. Since in recent years the use of gas for refrigerating, cooking, and central heating purposes has become increasingly popular, the use of several regulators in a single home is now not uncommon. Such widespread use has created a vast market for regulators and, consequently, there are a number of capable manufacturers constantly endeavoring to improve their regulators so that they might obtain a more profitable share of the business which is available.

Inasmuch as the performance requirements for gas regulators are governed by the standards of the A. G. A. (American Gas Association), it may be stated that a general goal of all improvements in gas regulators is to provide a regulator which will pass the A. G. A. inspection and which is less expensive to manufacture than equivalent devices offered by competitors.

It is indeed singular that in pursuit of this goal all of the manufacturers producing approved gas regulators, as listed on pages 198–201 in the "Directory of Approved Gas Appliances and Listed Accessories" published October 1, 1947 by the American Gas Association Testing Laboratories, have settled upon the same fundamental design. This design is shown in Patent No. 2,137,025 to Fritz Niesemann and in Patent No. 2,183,569 to Ralph C. Hughes, these patents being assigned to the Pittsburgh Equitable Meter Co. and the Reynolds Gas Regulator Co., respectively, the two largest manufacturers of gas regulators. It comprises a valves body having an inlet and outlet which are ordinarily aligned on a horizontal axis but separated by a dividing wall which includes a horizontal portion having an opening which is under the control of a reciprocable valve, this valve usually being affixed to a spring loaded diaphragm which is under pressure from the outlet side of the regulator.

In spite of the fact that the regulator design just described is universally accepted as the most satisfactory design which is available, there is still much room for improvement in gas regulators. It is the function of the valve in the regulator to cause a controlled pressure change and, in the ideal case, this would take place with no loss in energy. Actually, however, there is always a loss in energy and it is reflected in the fluid as a pressure drop which is in addition to the pressure change caused by the valve. Such pressure drops are obviously undesirable, since they represent energy losses, their effect being particularly objectionable at low inlet pressures when the valve is wide open. A shortcoming of the conventional design supra is that this additional, undesired pressure drop is high and often critical. In perhaps the majority of applications, the pressure regulator is used in the supply line in series with an automatic control or shut-off valve, a unit which is considerably more expensive than the regulator. The capacity of the unit receiving the gas should obviously determine the size of the pipe line which is used and thus the size regulator and shut-off valve. However, the A. G. A. specifies a maximum permissible pressure drop across these valves and if this is exceeded, as it is very often, then it is necessary to resort to one of two expedients. The first of these is to use a larger and more expensive regulator than is dictated by the capacity required and reduce the inlet and outlet ports to fit the supply line by means of suitable reducing nipples. This is clearly a makeshift arrangement and it visibly appears so to anyone observing the circuit. Because of this, the second expedient is resorted to in the more important applications. It consists of enlarging the supply pipe and the valve and regulator units contained therein. Clearly this results in a marked increase in the cost of the circuit. Adjustments of this nature are a common, every day experience in the gas appliance industry and could in most cases be avoided if regulators were available which had lower pressure drops.

A second feature of the conventional regulator which is capable of improvement is the regulation. In the ideal regulator, the outlet pressure, within prescribed limits of throughput, will remain absolutely constant regardless of the rate or range of fluctuation of the inlet pressure. In the conventional regulator, however, the outlet pressure fluctuates under such operating conditions, hence, in recognition of this fact, the A. G. A. has prescribed certain permissible ranges of fluctuation under given operating conditions. Regulation in the conventional design has been found to be largely dependent on the size of the diaphragm and, in general, improves as the diaphragm size increases. In the conventional design, it has been found necessary to have a ratio of diaphragm area to area of the valve seat opening of approximately 14 to 1. Regulator size for a given capacity, and thus the amount of metal required are very largely determined by the area of the diaphragm. Since the material cost represents a large percentage of the cost of a regulator, it will be apparent that by reducing the size of the diaphragm, and yet providing satisfactory regulation, the cost of manufacturing regulators may be considerably reduced. Aside from the cost standpoint, it is desirable to decrease the bulk of regulators so as to make possible their installation in crowded areas without sacrifices in other directions.

In view of the foregoing discussion of some of the shortcomings of the standard gas regulators, some of the objects of the invention have become self-evident. A main object is to provide a new basic regulator design in which the pressure drop is held to a minimum and is substantially less than that of equivalent regulators heretofore known. A second object is to improve the regulation of gas regulators and thus substantially reduce or eliminate fluctuations in outlet pressure. A further object is to decrease the size of diaphragm required for satisfactory regulation. An additional object is to materially decrease the size and thus the cost of gas regulators.

The principles of design whereby these and other objects of the invention are accomplished are revealed in a preferred form of gas regulator which is shown by way of illustration but not of limitation in the accompanying drawings wherein:

Fig. 1 is a vertical cross section through the improved gas regulator and is taken on line 1—1 of Fig. 2;

Fig. 2 is a vertical cross section through the improved regulator as taken on line 2—2 of Fig. 1;

Fig. 3 is a cross section of the regulator along the line 3—3 showing one form of guide means for the valve; and Fig. 4 is a schematic diagram showing the flow streamlines through the regulator in plan and in side elevation.

Referring to the drawings, the improved gas regulator has a body or housing 1 which, as distinct from gas regulators now familiar to the art, has a straight and continuous or undeviated flow passage 3 therethrough. The passage 3 is intersected at a central portion by a valve chamber 5, which is formed within the housing 1, and may thus be regarded as divided into an inlet passage 7 and an outlet passage 9. These passages are preferably made of uniform diameter, this diameter preferably being the inside diameter of the inlet and outlet pipes which are received by the threaded enlargements 11 and 13 at the outer ends of the passages 7 and 9.

The valve chamber 5 may have a lower portion 15 and an upper portion which intersects the passage 3. At least one side of the upper portion which intersects the passage 3, and preferably the entire portion, is formed on a surface which, for lack of a better generic and descriptive term, may be referred to as doubly tapered or substantially conical. Such a surface tapers in a vertical direction with respect to both the section planes 1—1 and 2—2. Spherical or pyramidal surfaces are thus doubly tapered, and while these and other surfaces may be employed in the practice of this invention, practical considerations make the conical form of surface illustrated most desirable. The valve seats 17 and 19 which surround the openings of the passages 7 and 9 into the valve chamber 5 are thus, in the preferred embodiment shown, formed on a conical surface. These seats may be formed on upraised lands in the valve chamber for ease in machining and to provide better engagement with the valve.

A valve 21 is disposed in the chamber 5 and has a surface which cooperates with at least one of the valve seats 17 and 19 to seal off or meter flow through the passage 3. In the preferred embodiment, the valve 21 is coniform and cooperates with each of the seats 17 and 19. It will be noted that the axis of the valve 21 is normal to the axis of the passage 3 so that the valve moves across the passage rather than in or along it.

The valve 21 may be moved toward or away from its valve seats by any suitable means in response to variations in pressure of gas flowing through the passage. Thus, it may have a coaxial stem 23 which extends through an aperture 25 in the housing 1 into a depression or recess 27 formed therein. A cover 29 has a recess 31 which mates with the recess 27 to form a diaphragm chamber 33 and the periphery of diaphragm 35 is clamped in a gas tight manner between suitably joined flanges on the cover 29 and housing 1 as shown at 37, fluid (air) being exhausted from the top of the diaphragm through the vent 38. The stem 23 is clamped to the diaphragm 35 for movement therewith by any suitable means such as the diaphragm plates and clamping nuts shown at 39. The valve 21 is yieldably biased to an open position by means of a spring 41 which is inserted between the upper surface of the diaphragm 35 and an adjusting plug 43 that is threaded into the upstanding, tubular spring guide 45 formed in the cover 29. A passage 47 connects the recess 27 on the underside of the diaphragm 35 to pressure in the outlet passage 9 so that this pressure force acts in opposition to the force of spring 41 on the diaphragm. A cap 49 may be threaded into the top of the guide 45 and is adapted by means of hole 51 to receive the standard sealing means employed to inhibit unauthorized adjustment of the compression of spring 41.

It will be recognized that the lower end of the valve 21 is not laterally supported by the stem 23. It is desirable to provide suitable guide means, however, to engage the valve so as to prevent lateral movement thereof with respect to its seats 17 and 19. While this guide may be of various forms, a preferred arrangement consists in forming at least one vertical projection 53 on the inner wall of the lower chamber portion 15. This projection should be on the outlet side of the valve 21, because of unbalanced forces on the valve urging it against the outlet seat 19, and adapted for continuous engagement with a lower portion of the valve periphery to thereby block any non-axial movements. Other means to guide the valve may also be employed. For example, an upright axial plug (not shown) may be affixed to the cover 55, which seals the bottom of chamber 5, and engaged with an axial bore in the valve.

In operation, the compression on spring 41 is adjusted by means of plug 43 in accordance with the outlet pressure which it is desired to maintain. With no flow and with pressure less than that required to overcome the initial setting of the spring, the valve 21 is in its lowermost position to provide a maximum opening through the seats 17 and 19. When the inlet pressure increases or when the volume of gas being used by devices on the outlet side of the regulator decreases, it is instantaneously reflected on the outlet side of the valve 21 as a pressure increase which passes through passage 47 to the underside of the diaphragm 35 to move the valve 21 upwardly. This restricts the size of the openings of the passages 7 and 9 and causes a pressure change in fluid passing by the valve 21 which reduces the inlet pressure to the desired constant value on the outlet side. This pressure change occurs without substantial energy loss as a result of variation in the size of the orifice, the pressure energy being changed into velocity energy. In case the inlet pressure drops or the volume of gas required increases, this will be reflected by a lowering of pressure on the diaphragm 35 and the valve 21 will move downwardly to decrease the pressure change between the inlet and outlet passages 7 and 9.

In the light of the foregoing embodiment, the principles upon which this invention is based may recognized. As initially mentioned, any pressure drop (as distinct from pressure change due to the control which the valve exercises over the openings 17 and 19) or energy loss is undesirable. It is immediately apparent that in the present construction such pressure drop will be markedly less than in the conventional design which is now in universal use. In the conventional design, the pressure drop is the summation of a series of smaller pressure drops caused by various design features. One feature of the conventional design which causes a pressure drop is the deviated and discontinuous flow passage through the valve body which causes the fluid to make four 90° bends. In contrast, gas through the present valve follows a continuous, substantially undeviated path as indicated by the flow streamlines schematically shown in Fig. 4. Another feature of the conventional design which causes a pressure drop is the several variations in cross-sectional area of the flow passage. In the present design, the passage is substantially uniform in cross-sectional area, hence energy-dissipating changes in volume are not required. The resistance to flow is proportional to the length of the passage through the valve and this is substantially reduced in the present regulator due to the elimination of the various bends. It will, therefore, be recognized that by eliminating or reducing these and various other impediments to flow that the present invention has been able to reduce the energy losses and pressure drop through a gas regulator to what appears to be the ultimate practical minimum. In fact the only undesired pressure drop which occurs in the present design is due to the resistance of the passage walls. By reducing the length this is held to a minimum and by making the passage straight it is possible to smoothly machine the entire wall surface so as to provide a still further advantage over the flow passage used in the conventional design.

If it had no other advantages, a gas regulator providing the aforedescribed reduction in pressure drop would be an important advance in the art. However, in addition to this, gas regulators constructed in accordance with the present invention have been found to give better regulation, i.e., constancy of outlet pressure, thus permitting a very substantial reduction in size and the accompanying economies of cost and space. This is attested by the fact that regulators in accordance with this invention are only about one-half to two-thirds the size of conventional regulators of the same capacity but have nevertheless passed the required tests and been given A. G. A. approval. For example, a conventional one-half inch regulator is about 4¾ inches outer diameter with an area of 17.7 sq. in. The present one-half inch regulator which has received A. G. A. approval is only 2⅞ inches outer diameter and 6½ sq. in. area. Furthermore, in addition to being so much smaller, the one-half inch regulator of the present design has a greater capacity than the old one-half inch regulator, its capacity being 66,000 B. t. u./hr. as compared with 64,750 B. t. u./hr. for the conventional regulator.

While the reason that the present design provides this improved regulation cannot be stated with certainty, since it is an unexpected but wholly welcome outcome of a design intended to reduce the pressure drop to a minimum, it is believed to be associated with a reduction in the number of pressure drops occurring in the fluid as it flows through the valve body. As just pointed out, gas flowing through the conventional regulator undergoes a series of pressure drops, the summation of which comprises the excessive pressure drop which it is desired to eliminate. To simplify theoretical considerations, these individual pressure drops are always regarded as having a constant relationship to flow conditions, such as pressure, volume, etc. Though for most considerations the assumption of uniformity is satisfactory, it is believed that actually, however, these drops fluctuate and are not uniformly related to flow conditions. With several drops, it is not surprising that at least one be fluctuating and reflect itself in variations in the outlet pressure. In the present design, the number of these pressure drops has been greatly reduced, as mentioned above, with the result that the outlet pressure is more uniform and indeed is constant over a much wider range of flow conditions for a given valve than heretofore obtainable.

This application is a continuation, in part, of application Serial No. 724,525 entitled Fluid Flow Control Means filed January 27, 1947, now abandoned.

It will, of course, be appreciated that the foregoing description and illustration do not define the limits of the invention which is capable of further modification in accordance with the skill of those in the art.

What is claimed is:

1. A gas regulator comprising a valve body having a valve chamber, said body having inlet and outlet passages opening respectively into opposite sides of said chamber, said passages being located substantially on a common axis, a substantially conical valve and valve seat in said chamber between the openings of said passages into said chamber and directly in the path of gas flowing through the chamber from the inlet to the outlet passage, said valve being movable along its axis toward and away from said valve seat, the axis of said valve and seat being substantially perpendicular to the axis of said passages, and a diaphragm in said body responsive to the pressure of gas in said outlet passage for moving and positioning said valve relative to said seat so that the position of said valve is automatically determined by said pressure and its distance from the seat is dependent upon and inversely related to the pressure.

2. A gas regulator comprising a valve body having a valve chamber, said body having inlet and outlet passages opening respectively into opposite sides of said chamber, said passages being located substantially on a common axis, a substantially conical valve and valve seat in said chamber between the openings of said passages into said chamber and directly in the path of gas flowing through the chamber from the inlet to the outlet passage, said valve being movable along its axis toward and away from said valve seat, the axis of said valve and seat being substantially perpendicular to the axis of said passages, yieldable means in said body urging the valve away from said seat, a movable pressure receiving diaphragm secured in said body and operatively connected to said valve so that pressure thereon acts in opposition to said yieldable means, said body having a gas passage operatively connecting said diaphragm to said outlet passage.

3. A gas regulator comprising a valve body having a valve chamber, said body having inlet and outlet passages opening respectively into opposite sides of said chamber, said passages being located substantially on a common axis, a substantially conical valve and valve seat in said chamber between the openings of said passages into said chamber and directly in the path of gas flowing through the chamber from the inlet to the outlet passage, said valve being movable along its axis toward and away from said valve seat and such movement constituting the means by which the valve controls flow of gas from the inlet to the outlet passages, the axis of said valve and seat being substantially perpendicular to the axis of said passages, yieldable means constantly urging said valve to move axially in one direction, and pressure responsive means responsive to a varying pressure operatively connected to said valve and moving it along its axis to effect flow control of the gas, said last means constantly acting in opposition to said yieldable means so that the equilibrium between said yieldable means and said pressure responsive means automatically determines the position of said valve and its distance from said seat throughout the range from fully opened to fully closed positions.

4. The invention set forth in claim 1 wherein said body has a rib formed therein in said chamber and extending axially with respect to the axis of the valve and continuously engaging an edge of the valve to substantially prevent transverse deflection thereof away from the opening of said inlet passage into said chamber.

5. In a gas regulator, the combination of a housing having a diaphragm chamber with a vertical axis and a straight-through substantially unrestricted gas passage spaced from the chamber and located on a horizontal axis substantially intersecting and perpendicular to said chamber axis, said housing having a valve seat intersecting an intermediate portion of said passage and dividing it into an inlet section and an outlet section, a diaphragm in said chamber and exposed on one side to pressure in said outlet section so that it moves along said vertical axis, a valve cooperating with said seat and secured to the diaphragm for movement therewith along said vertical axis, said valve and seat being substantially conical with respect to said axes.

6. In a gas regulator, the combination of a housing having a diaphragm chamber with a vertical axis and a straight-through gas passage of substantially uniform diameter spaced from the chamber and located on a horizontal axis substantially intersecting and perpendicular to said chamber axis, said housing having a valve seat intersecting an intermediate portion of said passage and dividing it into an inlet section and an outlet section, a diaphragm in said chamber and exposed on one side to pressure in said outlet section so that it moves along said vertical axis, a valve cooperating with said seat and suspended from said diaphragm and movable therewith along said vertical axis, said valve and seat being substantially conical with respect to said axes and said seat being located on the inside end of the inlet section, and means preventing non-axial deflection of said suspended valve comprising a vertical surface in said housing continuously engaging a maximum diameter portion of the valve on a side of the valve opposite said seat.

7. In a gas regulator, the combination of a valve body having a diaphragm chamber opening out of one side and a valve chamber opening out of the opposite side thereof, covers secured to the body and closing said chambers, a diaphragm secured to the body in said diaphragm chamber and movable along a vertical axis, a conical valve in said valve chamber and secured to the diaphragm for movement therewith along said axis, a conical valve seat formed in the top of said valve chamber on the axis of said valve movement, said seat being of no greater diameter than the chamber opening so that it is completely accessible from the outside of the body when the valve chamber is removed, a straight through horizontal gas passage in said body below said diaphragm chamber and divided by said valve seat into inlet and outlet sections, and means exposing the underside of the diaphragm in said chamber to gas pressure in said outlet section.

8. The invention set forth in claim 7 wherein said body includes a support rib on the outlet side of the seat continuously engaging a side of the valve, said rib being accessible through said chamber opening and extending vertically and parallel to the axis of the valve.

9. The invention set forth in claim 1 wherein said body includes a single rib located on the outlet side of said chamber and continuously engaging a maximum diameter portion of the valve to substantially prevent transverse deflection thereof away from the opening of said inlet passage into said chamber, said rib being parallel to the axis of the valve and lying in a plane defined by the axis of the valve and said common axis.

FRANK KERN, JR.

References Cited in the file of this patent

UNITED STATES PATENTS

| Number | Name | Date |
|---|---|---|
| 390,568 | Carter | Oct. 2, 1888 |
| 647,882 | Scott | Apr. 17, 1900 |
| 1,202,527 | Hynes | Oct. 24, 1916 |
| 1,270,049 | Murray | June 18, 1918 |
| 1,636,919 | Miller | July 26, 1927 |
| 1,885,389 | Temple | Nov. 1, 1932 |
| 1,891,759 | Flodin | Dec. 20, 1932 |
| 2,021,053 | Englebright | Nov. 12, 1935 |
| 2,051,484 | Jordan | Aug. 18, 1936 |
| 2,380,459 | Niesemann | July 31, 1945 |

FOREIGN PATENTS

| Number | Country | Date |
|---|---|---|
| 349,663 | Great Britain | June 4, 1931 |